(12) United States Patent
Farone et al.

(10) Patent No.: US 6,551,378 B2
(45) Date of Patent: Apr. 22, 2003

(54) RECOVERY OF PRECIOUS METALS FROM LOW CONCENTRATION SOURCES

(75) Inventors: William A. Farone, Irvine, CA (US); Maryam H. Azad, Los Angeles, CA (US)

(73) Assignee: Green Mineral Products LLC, San Antonio, TX (US)

( * ) Notice: Subject to any disclaimer, the term of this patent is extended or adjusted under 35 U.S.C. 154(b) by 0 days.

(21) Appl. No.: 09/789,270

(22) Filed: Feb. 20, 2001

(65) Prior Publication Data

US 2002/0112569 A1 Aug. 22, 2002

(51) Int. Cl.[7] .................................................. C22B 3/10
(52) U.S. Cl. ............................. 75/720; 75/741; 75/744; 75/586; 423/22; 423/24
(58) Field of Search ..................... 423/22, 24; 75/720, 75/741, 744, 586

(56) References Cited

U.S. PATENT DOCUMENTS

| | | | |
|---|---|---|---|
| 3,960,549 A | 6/1976 | MacGregor | |
| 3,979,207 A | 9/1976 | MacGregor | |
| 4,105,442 A | 8/1978 | Fieberg et al. | |
| 4,331,634 A | 5/1982 | Shanton et al. | |
| 4,382,067 A | 5/1983 | Grant | |
| 4,571,265 A | 2/1986 | Konig et al. | |
| 4,571,266 A | 2/1986 | Konig et al. | |
| 4,723,998 A | * 2/1988 | O'Neil | 75/711 |
| 4,885,143 A | * 12/1989 | Schmuckler | 423/24 |
| 5,256,187 A | * 10/1993 | Gefvert | 75/717 |
| 5,304,233 A | * 4/1994 | Awadalla et al. | 75/741 |
| 5,401,296 A | 3/1995 | Martenson et al. | |
| 5,529,606 A | * 6/1996 | Hewlett | 75/743 |
| 6,315,812 B1 | * 11/2001 | Fleming et al. | 75/744 |
| 6,428,599 B1 | 8/2002 | Cashman | 75/319 |

OTHER PUBLICATIONS

Savitsky et al, *Physical Metalurgy of Platinum Metals* (Translated from Russian by Savin) 9, 1147 (1978).
Greenwood et al, *Chemistry of the Elements,* 1294 (1997).
Kutner, *Astronomy, A Physical Perspective,* 622–624 (1987).

* cited by examiner

*Primary Examiner*—Melvyn Andrews
(74) *Attorney, Agent, or Firm*—Cynthia H. O'Donohue

(57) ABSTRACT

A process for the recovery of gold and the platinum group metals from sources that contain relatively low amounts of the metals is described. The process is environmentally acceptable and uses no expensive and potentially dangerous organic solvents. The process utilizes hydrogen chloride, sodium hydroxide, and cation resins to concentrate and purify the precious metals

26 Claims, 4 Drawing Sheets

RECOVERY OF PRECIOUS METALS FROM LOW CONCENTRATION SOURCES

FIELD OF INVENTION

This invention relates to an environmentally acceptable process for the extraction and recovery of gold and platinum group metals from ores containing low concentrations of these precious metals.

BACKGROUND OF THE INVENTION

Traditionally the recovery of gold and the platinum group metals from ores containing these metals has been achieved by extraction with cyanides, by mercury amalgamation, flotation, and electrolytic separation and electrostatic separation. In the electrostatic separation method, the metals in the dry ore are electrostatically charged, usually by passing a high velocity arc through the ore and then the precious metals are recovered on an oppositely charged collector. In electrolytic separation, the metals in an ore are dissolved and then electroplated on an oppositely charged electrode. Other methods of separation that have been used include gravimetric differential density separation, chlorination, ion exchange, and other procedures both mechanical and chemical.

All of the aforementioned processes are costly, time consuming, inefficient, and environmentally polluting as they recover only a small fraction of the precious metals in the ore, or require the use of toxic chemicals which can be injurious and damaging to plant and animal life when discharged to the environment.

Accordingly, there exists a need for a method, which achieves greater recoveries of precious metals than the currently available practiced methods. There is further a need for a simple, low-cost, non-polluting, and efficient method for the extraction of gold and the platinum group metals from ores without the use of toxic chemicals such as mercury, cyanides and strong acid leaches that persist for long periods of time. A less costly process in plant cost and labor than conventionally used mechanical procedures is highly desirable. Additionally a need exists for a process where the recovery of precious metals occurs from low concentration sources, such as mine "tailings". Another highly desirable feature is the remediation of the aforementioned sources such as tailings such that they are rendered useful, thus simplifying disposal of the residual ores or reprocessed mine tailings.

BRIEF SUMMARY OF THE INVENTION

It is an objective of this invention to provide a method, which achieves greater recoveries of gold, and platinum group metals than currently practiced methods from low concentration sources.

It is an added objective of this invention to provide a composition of innocuous chemicals at the completion of this process, which are useful as an extractant for precious metals in sources with low concentrations.

It is a further objective of this invention to provide a simple, low cost, non-polluting, and efficient method for the extraction of gold, and the platinum metals from low concentration sources without the use of toxic chemicals such as mercury, cyanides and strong acid leaches that will be discharged into the environment.

It is likewise an objective of this invention to provide a precious metal recovery method which poses no threat to the environment or ground water and provides a process which remediates such low concentration sources as mine tailings such that they can be used in other processes such as pozzolanic materials for use in concrete.

BRIEF DESCRIPTION OF THE INVENTION

This invention comprises a method for the extraction of gold and the platinum group metals (ruthenium, rhodium, palladium, osmium, iridium, and platinum) from, but is not limited, to low concentration ores, recovered catalysts and other sources by the use of inexpensive and small quantities of common chemicals, non-toxic to the environment or ground water. The invention is best described with reference to FIGS. 1 through 3, which are process flow diagrams of the precious metal recovery method of this instant invention.

The source material is comminuted prior to entry into the initial extraction tank. Some ores required thermal shocking to allow more of the ore to be extracted by the leaching solution. This solution comprises a mixture of hydrochloric acid (HCl) and sodium hypochlorite (NaOCl) which under acidic conditions is converted to chlorine ($Cl_2$). All steps involving the use of HCl and NaOCl are carried out in enclosed systems under negative pressure where any fumes are scrubbed through a spray mist of sodium hydroxide, sodium carbonate, or similar salts or mixtures thereof. The required $Cl_2$ is created within the extraction vessel thereby eliminating the need for the handling of $Cl_2$. The $Cl_2$ only exists within the enclosed vessel for a short period of time until the desired metals are oxidized to the chloride salts.

After extraction the liquid can be decanted and the 'bottoms, the residual material that contains the extracted ore, are sent to a counter current extractor prior to drying for use as soil amendments or concrete additives. Any residual salt in the extracted ore is washed in the counter current extractor.

Neutralization of the liquid generates base metal precipitates as hydroxides. The precious metals remain in the liquid. The base metal precipitates are filtered. Residual base metals in the solution with the desired metals are further extracted through a strong acid cation resin prior to treatment by a reducing agent. Treatment of the filtered leach solution with a reducing agent precipitates the precious metals. The precious metals at this point are a mixture of the desired metals. They can be commercially utilized by conventional techniques such as smelting for further purification. In the desired process, however, they are redissolved in HCl with sufficient oxidizing agent (NaOCl can be used again) to convert them back to the chloride salts. The precious metals existing as chloride salts are separated by chromatography. After separation the precious metal salts are reduced to the pure metal by hydrogen reduction.

BRIEF DESCRIPTION OF DRAWINGS

This embodiment depicts the novel and non-obvious process of this invention relating to an environmentally acceptable process for the extraction and recovery of gold and platinum group metals from ores containing low concentrations of thee precious metals as shown in the accompanying drawing, which is for illustrative purposes only. This drawing includes the following figures (FIG. 1 to FIG. 4, with like numerals indicating like parts.

DETAILED DESCRIPTION OF THE INVENTION

The invention comprises an environmentally safe, low-cost method for the extraction of gold and the platinum metals from ores containing these metals. The method is broadly applicable to any of many sources of precious metal containing solid material such as tailings from mining operations, previously unprocessed ore, etc. It is particularly effective in extracting very low concentration of metals along with any base metals present. The feature of this invention process is that the processing conditions and controls of the method allow the use of non-toxic chemicals, which pose no threat to the environment or to the ground water when the process is completed.

The objective of this instant invention is to extract gold (Au) and platinum group metals (PGM) from multiple sources containing relatively low concentrations of the metals such that: the process (1) is economically reasonable; (2) is environmentally acceptable; (3) is adaptable for all of the PGMs and Au; (4) uses no expensive and potentially dangerous organic solvents; (5) uses readily available equipment; (6) concentrates and recovered extremely low concentrations of Au and PGMs; and (7) extracts, separates, and purifies the metals.

The invention is best described by reference to the process detailed in FIGS. 1 through 3.

Figure 1:
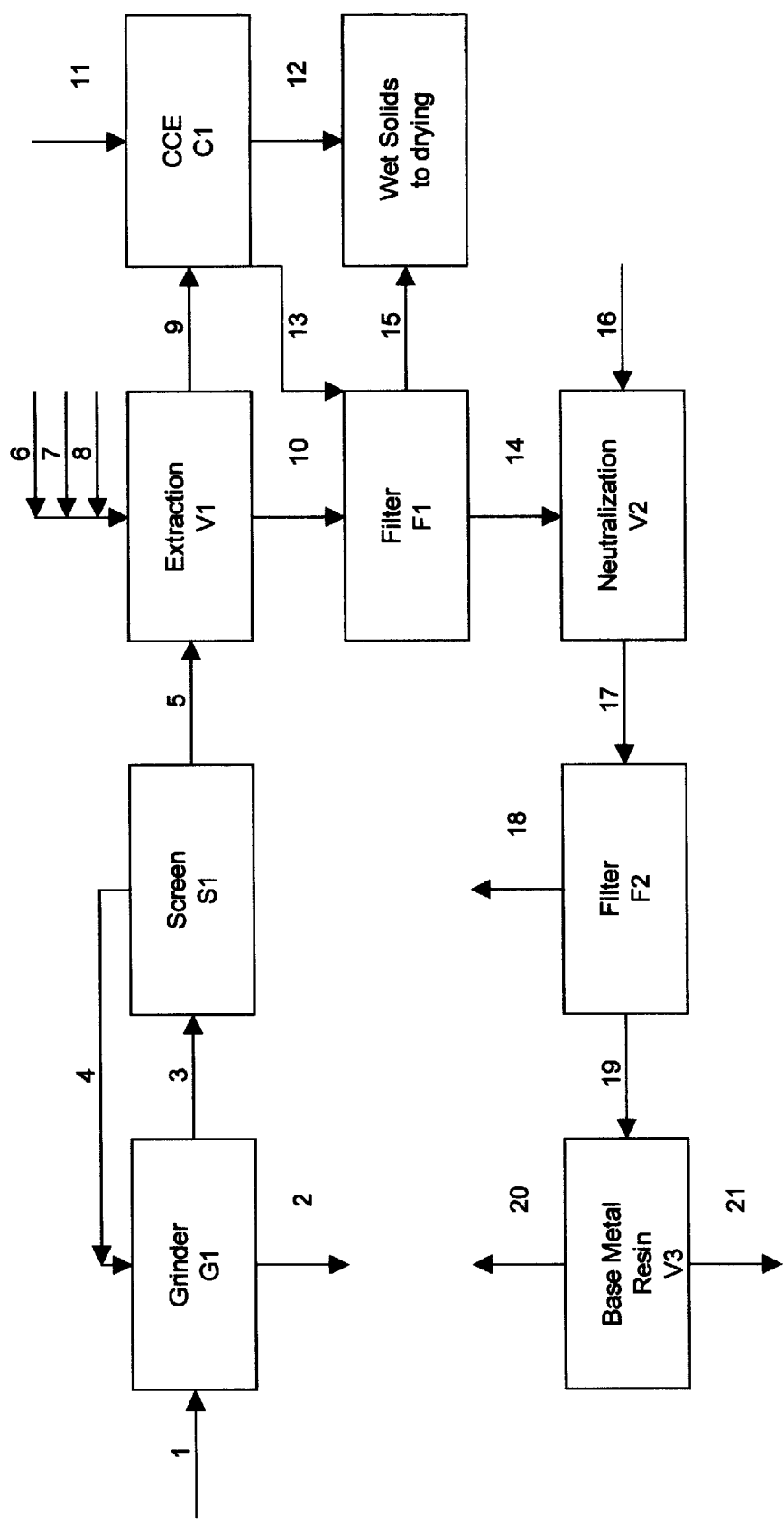
FIG. 1 is the flow diagram for the initial extraction of the ore and the separation of the base metals from the precious metals process.

The first 20 process streams are shown in FIG. 1. The feed (1) of low concentration source of Au and PGMs, which may be but is not limited to mine tailings, ore, recovered catalyst, enters the grinder G1 and is ground to a particle size of less than 100 mesh, preferably about 150–250 mesh, most preferably 150 mesh. The dust (2) is collected via a bag house or negative pressure so that particulate emissions from the grinding step are not an environmental hazard. These 'fine' can be added to the extraction tank V1. The ground ore (3) enters the screen S1 where particles less than the preferred size of 150 mesh pass through (stream 5) to the extraction vessel V1. Particles greater than 150 mesh are recycled (stream 4) back to the grinder G1 for further remediation.

An optional step in the process is based on the finding that some sources contain the desired metals trapped in a highly refractory matrix such as certain types of silica and silicates and these trapped metals are not easily removed. For these sources thermal shocking of the material has been found to allow more of the source material to be leached by the extracting solution. This optional step, when required, is performed to process stream 5 between screen S1 and the extraction vessel V1.

In the optional thermal shocking step the source material is rapidly heated to above 600° C. but not above 1400° C., preferred range of about 1000° C. to 1200° C. degrees, more preferably about 1100° C. degrees so as not to cause melting and fusion of the source material. The heating is carried out as quickly as possible, preferably in one minute or less. The treated material is cooled rapidly in about 0.1 to 1.0 minutes to room temperature to cause internal 'fracture' of the source particles and thus increasing the surface area for the leach solution.

In the initial extraction tank V1 the ore is contacted with the leach solution (6, 7, 8). If the particles are smaller than specified by the limitations of this instant invention, the resultant mixture forms a "mud" that is difficult to handle without the addition of excess leach solution. The basis of the invention is to keep the concentrations of Au and PGMs as high as possible in the leach solution and to minimize the use of excess leach solution. Thermal fracturing of the material surfaces is the preferred step rather than further grinding of the source particles.

The leach solution is a mixture of hydrochloric acid (HCl) and sodium hypochlorite (NaOCl) which when added to the acid becomes chlorine ($Cl_2$). The chlorine oxidizes both the Au and the PGMs to higher valence states and the chloride from the acid ensures that the higher valence states are soluble. First, concentrated HCl (6) is added to neutralize any inorganic species that will react such as but not necessarily limited to, calcium oxide, calcium carbonate, calcium hydroxide, iron oxide, and other base metal oxides, hydroxides, and carbonates. The use of concentrated HCl limits the amount of liquid used in the extraction vessel.

A dilute solution of HCl (7) is added to the mixture in the extraction vessel V1. Depending on the source materials being leached, the concentration of this solution is about 0.5% to 20%, preferably the range is 5% to 10%, more preferably the concentration is about 10%. This range results in the removal of the precious metals without creating excessive fumes. An important feature of this invention is the use of enclosed systems under negative pressure for all steps involving the addition of HCl or oxidizing chlorine species. The enclosed systems scrub the generated fumes through a spray mist of sodium hydroxide, sodium carbonate, sodium bicarbonate or similar salts or mixtures thereof This step removes any HCl or $Cl_2$ vapors from being exhausted from the process into the environment.

The addition of the HCl to V1 is followed by adding an oxidizing agent (8). It is another feature of this instant invention that the $Cl_2$ is created in the extraction vessel V1 by the addition of NaOCl or other hypochlorite salts. The rate of the addition of NaOCl is regulated to prevent sudden releases of $Cl_2$. The amount of NaOCl added is based on the total leach solution volume and the concentration of HCl. Typically the NaOCl solution contains 11% by weight of NaOCl and this solution is added such that the weight of the NaOCl solution is about 1.5% of the HCl solution. Since most of the $OCl^-$ ion is converted to $Cl_2$ in the HCl, the amount of $Cl_2$ present at any time can be controlled by the rate of addition of the NaOCl solution. For each 100 gallon of HCl solution then approximately 15 gallons of NaOCl solution can be added at the rate of about 1 to 4 gallons per hour, preferably at 3 gallons per hour. This feature of utilizing NaOCl to generate $Cl_2$ eliminates the need to handle and transport $Cl_2$ with all its corresponding hazards. As an example, NaOCl can be manufactured onsite electrolytically from common table salt (NaCl) and water. There are commercial units available for the manufacture of sodium hypochlorite and units for the manufacture of chlorine or chlorine dioxide can be easily converted to produce NaOCl from the anode solution rather than exhaust the gases. These solution are typically 5% to 12% NaOCl similar to commercial strength bleach which also can be used as a source of NaOCl. The amount of oxidizing agent as $OCl^-$ is 0.1% to 7.0% by weight of the active HCl where active is defined as the HCl added for the extraction and not the quantity needed to neutralize the ore. Typically about 0.5% to 1.5% of the oxidizing agent is added; preferably 1.0% oxidizing agent is added. Under the acid condition that exist in V1 the hypochlorite is chemically converted to the desired $Cl_2$ and the desired $HCl/Cl_2$ is present when the $OCl^-$ is about 1.0% of the total leach solution. Slightly more or less is needed with some source materials depending on the concentration of base metals. Source materials with higher levels of base metals require the higher level of OCl⁻.

Depending on the source material, the extraction time can range from 10 minutes to 24 hours. For most ores equivalent to copper or gold mine tailings, rhyolite ores and Pt or Pd catalysts, the preferable extraction time is 1 hour to 4 hours, more preferably 2 hours, to extract over 99% of the available precious metals. The quantity (by weight) of leaching solution to source material is from about 1 to 3, preferably 1.5 to 2.0, more preferably 1 to 1.

After extraction the bulk of the liquid is decanted from the extractor V1 and the liquid 10 is sent to the filter F1. The residue of source material and trapped liquid is defined in this invention as "bottoms. The bottoms still contain trapped leach solution and dissolved precious metals. The bottoms are not acceptable for discharge into the environment as they still contain some of the HCl/$Cl_2$ each solution.

The bottoms 9 are sent to a counter current extractor C1. C1 is a device for liquid extraction of solids that removes the precious metals and leach solution with the addition of minimal water 11. In C1 the solids are pushed up an inclined chute by a variable speed screw that can travel both forwards and backwards providing a 'washing' agitation. The leach solution with the added water 13 is sent to the filter F1 and the extracted source material with only residual water 12 is sent to drying for disposal or sale as soil amendments or concrete additives. Most extracted ores have been found to be excellent concrete additives replacing Portland cement or fly ash in concrete mixtures.

In the filter F1, the fines, particles of less than 325 mesh are removed to provide a clear leach solution. The fines 15 are combined with the stream 12 for drying and the leach solution 14 is sent to the neutralization vessel V2.

The addition of a concentrated base, such as sodium hydroxide (NaOH), sodium carbonate ($Na_2CO_3$) or other similar inexpensive agent 16 is used in the neutralization step. Depending on the agent, it may be added dry while others such as NaOH are added as a 50% solution. The caustic material is added until the pH of the solution is about 8.0 to 9.0, preferably 8.5. It was shown that all the chloride present will exist as the chloride ion. The remaining steps in the process can be conducted without concerns for the HCl/$Cl_2$ fumes, either for air pollution or potential effects as oxidizer or acid. During the production of the oxidizing agent NaOCl from NaCl, the NaOH is formed at the cathode of the electrolytic unit and the NaOCl is formed at the cathode. The cathode solution is about 10% NaOH and can be combined with the neutralization stream 15. Combining these streams aids in eliminating discharges from the system.

Base metal precipitates form as hydroxides during the neutralization step in V2. The concentration is dependent on the source material, the quantity neutralized and dissolved during extraction. The precious metals remain in solution during this phase. The mixture of precipitated base metal hydroxides and the leach solution 17 is sent to filter F2. The base metal precipitates 18 are filtered. These precipitates are useful as pozzolanic materials in concrete. These materials can be dried with the solids from stream 12 and 15.

Martenson (U.S. Pat. No. 5,401,296) used sodium borohydride as a reducing agent at this point to treat the leach solution. This treatment is ineffective for leach solutions containing base metals such as iron, copper, manganese or zinc at concentrations above 10 ppm For most source materials iron has been found to be the most significant inhibitor of the desired reduction. A critical step in this invention is sending the leach solution 19 through a resin in vessel V3. The resin is selected to bind only the base metals and not the precious metals. A typical commercial resin is a strong acid cation resin such as Sybron Chemical, Inc. C249NS. Preferably vessel V3 is operated as a resin bed wherein the base metals are extracted from the resin with fresh acid 20 such that the resin is reusable. Alternatively fresh resin can be added to vessel V3 and extracted with acid after the purified solution 21 is sent to vessel V4. The extract from the resin bed is monitored such that iron is 8 ppm or less in the desired solution of gold and platinum group metals.

Figure 2:
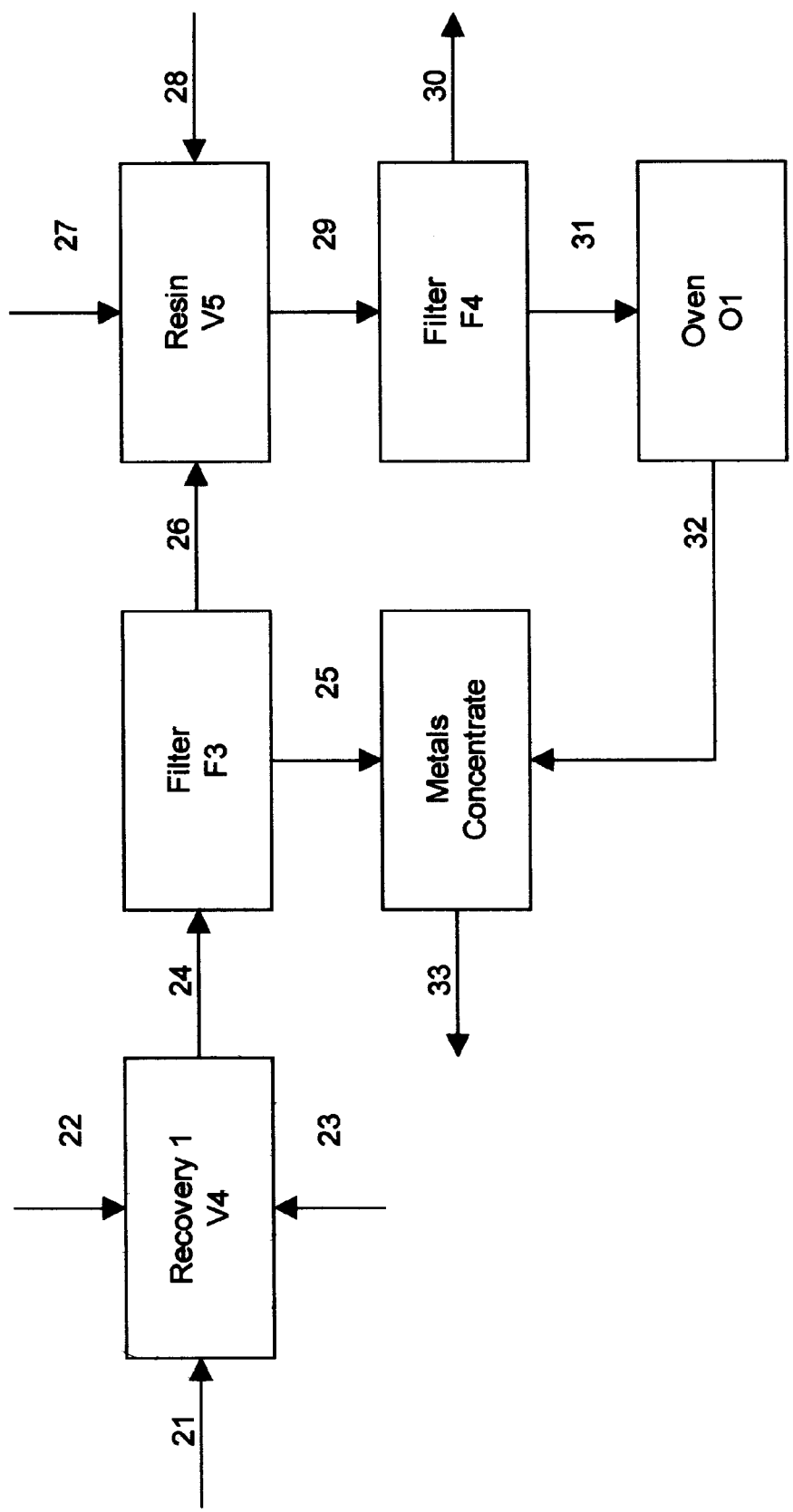
FIG. 2 is the flow diagram for the precipitation of the gold and precious platinum group metals process.

As shown in FIG. 2, the resin-treated solution (or mother liquor) 21 is sent to the recovery vessel V4. Sufficient reducing agent 23 is added such that the majority of the precious metals at concentrations above 20–30 ppm will precipitate. This process requires 1 to 3 hours, preferably 1 hour for most source material extract solutions. The pH for this reaction is set at about 8.0 to 9.0, preferably 8.5 with any adjustment made by the use of a caustic base such as NaOH 22.

The reaction solution along with the precipitated precious metals 24 are sent to filter F3 where the precipitated mixed precious metals are filtered from the solution. The metal solids 25 on the filter are collected and put into the metals concentrate storage area. The solution 26 with residual precious metals is sent to vessel V5 where any remaining metals are removed by a resin such as Sybron Chemicals, Inc. SR-3.

Removing the bulk of the precious metals in Vessel 4 prior to the resin step in vessel V5 is economically advantageous as the precious metals can only be recovered by burning the resin. If required, the precious metals can be concentrated by evaporation of the mother liquor (streams 21 or 26) to about 10% of original volume before either recovery steps.

In vessel V5 the pH is adjusted by HCl 27 to the optimum for the resin, typically pH1 to pH6. Resin 28 may be added as required. The mixture of resin and solution 29 is sent to a filter F4 where the resin is collected and the filtrate 31 is sent to an oven O1. The spent mother liquor 30 contains predominantly sodium and potassium salts as the precious metals have been removed. If desired these salts can be recovered by concentrating the stream 30 in an evaporator and crystallizer (not shown). The dried material can be used wherever low-grade salts are required. A portion of this material (stream 8) can be used to generate the NaOCl, which was added to the initial extraction vessel V1. After the resin is burned in the oven O1 at about 300° C. to 600° C., the ashes 32 containing the remaining precious metals are sent to the metals concentrate storage area and combined with the previous concentrates 25. The process now has a mixture of precious metals including but not limited to Au, Pt, Pd, Ir, Ru, Rh, and Os. However it is an objective of this invention to render these precious metals into a pure state as an integral part of this process.

Figure 3:
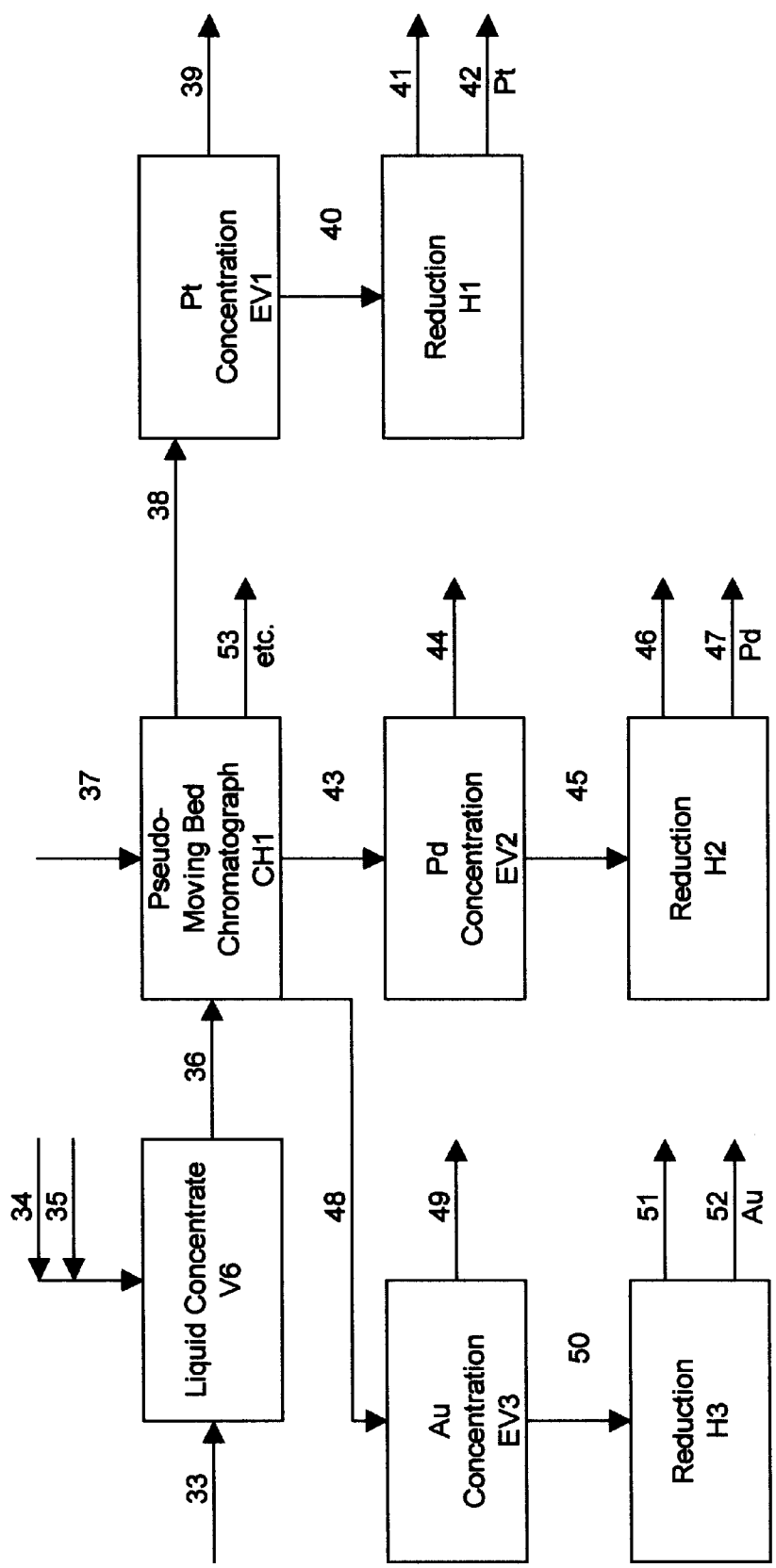
FIG. 3 is the flow diagram for the separation and purification of the gold and precious platinum group metals.

Referring now to FIG. 3, the concentrate 33 is dissolved in HCl/$Cl_2$ in vessel V6 where sufficient HCl 34 and NaOCl 35 is added to dissolve the metals at very high concentrations. Whereas in the initial extraction vessel V1 the concentration of precious metals was from about 5 ppm to about 250 ppm, the concentrations of the precious metals in V6 are much higher in the range of 500 ppm to 10,000 ppm, preferably about 10,000 ppm.

The precious metals exist as various chloride salts. The chloride salt mixture 36 is sent to the chromatographic system CH-1 where the mixture 36 is separated by chromatography. The technique is referred to as "pseudo-moving bed chromatography" or "simulated moving bed" chromatography as is usually practiced for the separation of sugars and other chemicals. The materials being separated flow through a series of valves and columns and separation occurs due to the differing binding capacity as the various salts move through the resins. Although the resin doesn't move, the different columns discharge various pure metals as the solution moves through the columns and it appears as if the raffinate was moving in one direction and the extract was moving in the other direction. The resin is selected to allow the different precious metals to move through the column at different speeds, thus allowing each metal to be removed. The metals are eluted with an HCl solution, 37. The Dow Chemical Company resin 50WX4–100 has been found particularly useful for this purpose.

The platinum solution 38 is sent to the evaporator EV1 wherein the solution 38 is evaporated leaving behind the chloride salts. The water 39 is collected and can be reused. The highly concentrated wet salts 40 are sent to hydrogen reduction in the reduction unit H1. This unit can be a small unit due to the scale of concentration. Pure platinum sponge metals is produced as the reduced product 42 while the off gases of water and can be scrubbed in the same system used for the extraction to eliminate the offgassing from the HCl.

The aforementioned system can be replicated for each of the metals in turn. The Pd rich stream 43 can be concentrated in evaporator EV2 and the water 44 reused. The wet Pd salts 45 can be reduced in $H_2$ and the pure Pd sponge 47 recovered. The water and HCl 46 can be treated as above. Streams 48, 49, 50, 51 and 52 follow the same process for Au and stream 53 indicates that the other metals can be similarly recovered if desired.

Care must be taken if osmium is separated due to its high toxicity. Metals that are not required or desired in streams represented by the outflow 53 of CH1 can be returned to the source material from which they were extracted by combining with the wet solids 12 and 15 used for incorporation in concrete.

The preparation of the pozzolanic material by these described steps for use as a concrete additive has the major and unexpected advantage that the silica content is increased in this process and only the cementitious oxides are added back. The process removes chlorides and other soluble salts that detract from the use of natural ores as pozzolanic materials. A long felt need is met by the process described above in that the process can be used for remediation of mine sites where significant quantities of mine "tailings" have accumulated and pose a threat to the environment. When the value of the recovered precious metals and the pozzolanic material exceed the processing costs, remediation of these tailings will be both desirable and economical. The inventors believe that the process will be economical for all sites where the sum total of Au, Pd, Pt, Ru, Rh and Ir exceeds 10 ppm to 15 ppm.

The following examples will serve only to demonstrate the various features of the invention and illustrate the results, which are obtained.

EXAMPLE 1

For the initial extraction (V1, FIG. 1) ore was ground to 150 mesh. The ground ore was heated at 1000° C. for 1 minute. For 10.1 grams of ore, 20 ml. of concentrated HCl (356%) and 4 ml. of 11% NaOCl was added. After the excess $Cl_2$ species were removed. The extract measured 40.5 ppm Au and 134.6 ppm Pt.

EXAMPLE 2

For another initial extraction (V1, FIG. 1) the ore was ground to 325 mesh. The ground ore was heated to 950° C. for 1 minute. A 10.07 gram sample was extracted with 20 ml. Of concentrated HCl (36%) and 4 ml of 11% NaOCl. The extract liquor was measured to contain 30.7 ppm Au and 163.9 Pt.

EXAMPLE 3

An example of initial extraction followed by neutralization one kilogram of 150 mesh ore was reacted with 800 ml of concentrated HCl 6 ((V1, FIG. 1). Next 1000 ml of a 20% HCl solution 7 (FIG. 1) was added, followed by 200 ml of 11% NaOCl 8 (FIG. 1). The extract solution 10 measured 65.5 ppm Pt after 2 hours and 66.0 ppm after 24 hours. The mixture was filtered (F1, FIG. 1) and 1700 ml of filtrate 14 was collected. To this filtrate 14 390 grams of a 50% NaOH solution 16 was added to obtain a pH of about 9 to 10 (V2, FIG. 1). This reaction formed 244 grams of solids that were filtered (F2, FIG. 1).

EXAMPLE 4

The filtrate 19 from Example 3 was subjected to a strong acid cation resin (V3, FIG. 1) to remove the base metals. Using iron as a marker for the base metals the solution 20 contained 8.2 ppm of iron when it exited the resin.

EXAMPLE 5

As an example of, but not limited to, a reducing agent 23, $NaBH_4$ is added to the mixture from the aforementioned filtrate 21 in Example 4. The quantity needed depends on the concentration of precious metals that are present and must be reduced. Sufficient reducing agent is added to drive the oxidation-reduction potential to below −600 mV, preferably −650 mV, and to hold the oxidation-reduction potential at the desired level. In this example, the Au content was decreased to 10.2 ppm from 20.1 ppm and the Pt content from 63.1 ppm to 32.1 ppm. Typically the residual liquid in V4 can be concentrated by the removal of water to increase the metals for further removal in V4 or V5 (FIG. 1).

EXAMPLE 6

A solution of 59.8 ppm Pt 26 was reduced to 5.1 ppm after treatment with Sybron SR-3 resin (V5, FIG. 2). This represents a 91.5% recovery. The residual dilute solution can be further concentrated to remove the then increased concentration of precious metals.

EXAMPLE 7

Figure 4:
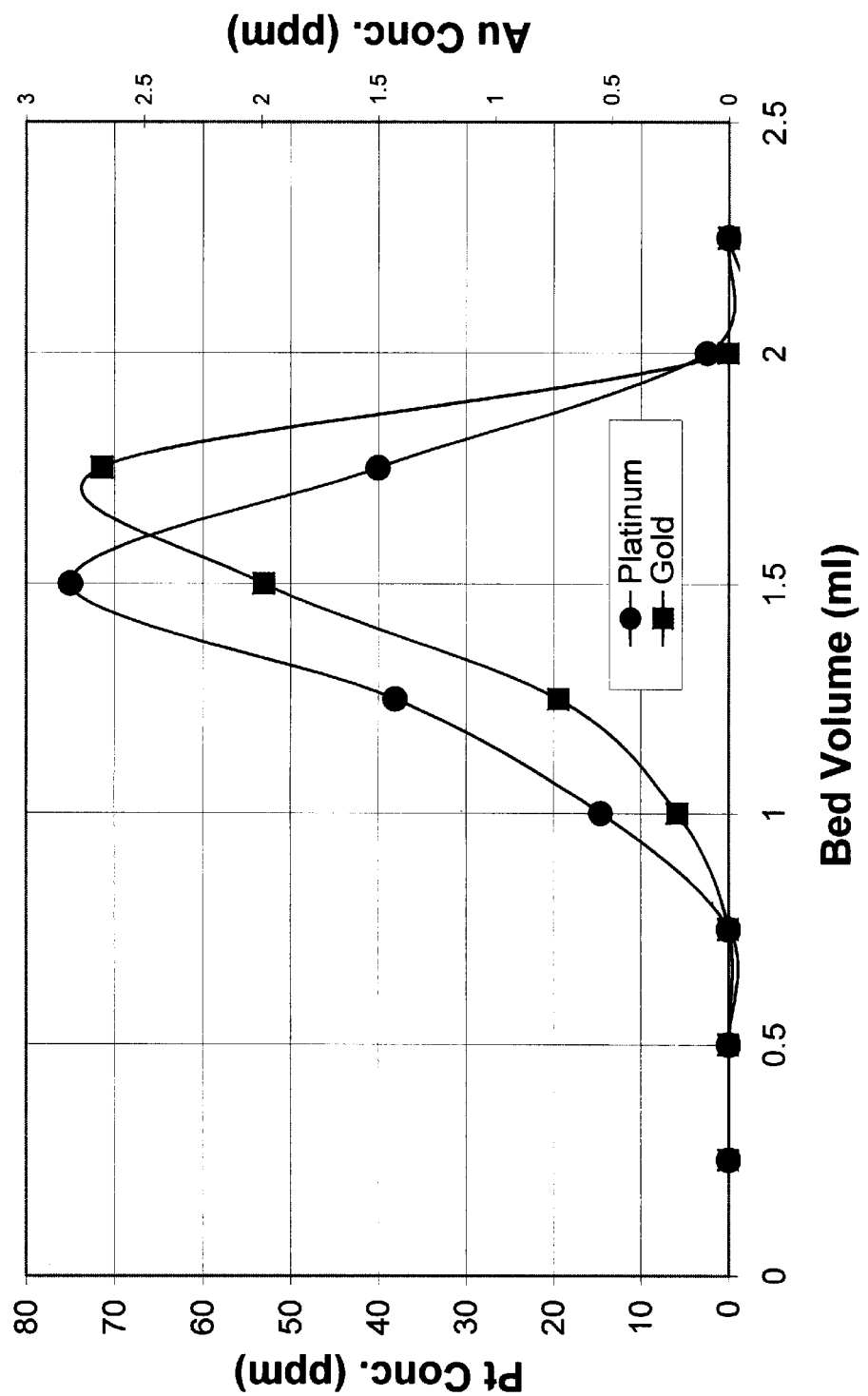
FIG. 4 illustrates the separation of gold (Au) from platinum (Pt) on a cation resin.

Chromatography of a gold and platinum mixture 36 extracted from ore was performed in a single "pulse" column (CH1, FIG. 3). FIG. 4 show that the two metals were separated by 0.25 Bed Volume (BV). In a continuous moving bed or pseudo-moving bed chromatographic system such as those sold by U.S. Filter (Rockford IL) or others, this type of separation can be quantitative. Differences of 0.05 to 0.1 BV have been demonstrated to be separated at 95% or better recovery of either of the two materials being separated by the technology.

EXAMPLE 8

Ore obtained from a mine tailings pile in Oatman, Arizona had an average of 61.0 ppm of Pt, 14.2 ppm of Au, and 12.8 ppm of Pd as measured by extraction with $HCl/Cl_2$ using Atomic Absorption Spectroscopy. To a 400 pound aliquot of this ore ground to approximately 150 mesh was added 600 pounds of 10% HCl. Next, 90 pounds of an 11% solution of NaOCl was added over a period of 6 hours. The NaOCl addition rate was controlled to prevent gas spikes of either HCl or $Cl_2$ that would overwhelm the gas scrubbing system in a pilot plant that was vented with a continuous flow rate of 10,000 scfm of air for a 250 gallon reaction system. At this point in the process (V1, FIG. 1) the platinum content of the leach solution was measured at 40 ppm (theoretical value 35.4 ppm). The leachate was neutralized with a 50% NaOH solution over 16 hours to prevent the precipitating base metal oxide salts from incorporating the precious metals during the precipitation process. The liquid leachate was decanted off the ore after settling. The leachate was circulated through a resin bed (Sybron Ionac C-249) until the iron content of the solution was reduced to 3.0 ppm. The solution was then reduced with NaBH to obtain 17.8 grams of metal precipitates. The theoretical amount of Pt, Pd and Au salts only (not including any Ru, Rh, Ir, and Os that can also be obtained) is 15.9 grams. Based on the measured Pt content of the leach which was 13% higher than the samples used for the initial determinations, recoverable Pt, Pd and Au should be about 18.0 grams.

EXAMPLE 9

Test ore from a location in Colorado was obtained that was previously ground to <400 mesh. For this extraction 800 pounds of 20% HCl was used and 120 pounds of 11% NaOCl. The larger amount of acid is due to expected difficulties in separating the ore, the solids, and the liquid phases. The larger concentration is to offset the higher limestone content of the ore. The leachate contained 75 ppm of Pt that is an equivalent of 172.5 ppm in the initial ore. The ore was originally measured at 176 ppm Pt in material at <150 mesh. This material was very difficult to separate from the leach. Decanting or simple filtering did not work and high-speed centrifugation was required. These process problems support the instant invention that particles finer than about 150–200 mesh in terms of extracting more are not required. Finer particles, i.e., ground to less than 250 mesh are more costly both to obtain and to process. When 50% NaOH was added in a time period of 15 minutes to this leach the Pt content was reduced from 75 ppm to 25 ppm. The fine particles and the rapid formation of base metal hydroxides caused incorporation of PGMs in the metal hydroxides. This occurrence illustrated another feature of this invention that NaOH must be added slowly enough to maintain the PGM salts in solution.

What is claimed is:

1. A precious metal recovery method which comprises:
    a. grinding precious-metal and base metals containing solids to obtain a solids fraction passing a less than 100 mesh screen;
    b. contacting said precious-metal-containing and base metals solids in an extraction tank with a leach solution comprising hydrochloric acid and an oxidizing agent for a time period ranging from 10 minutes to 24 hours;
    c. decanting said leach solution from said extraction tank and filtering said leach solution;
    d. sending residual solids from filtration step in (c) to an extraction vessel where residual leach solution from said filtration step is removed from said solids and combining said residual leach solution with filtered leach solution from step (c);
    e. neutralizing filtered solution from step (d) by addition of a alkali or alkaline concentrated base and precipitating any base metals present in said filtered solution as base metal hydroxides;
    f. filtering or centrifuging base metal hydroxides and treating filtrate or centrifugate containing the precious metals in solution with a resin to remove remaining base metals;
    g. precipitating precious metals from base metal free solution of step (f) with a reducing agent and recovering said precious metals.

2. The precious metal recovery method of claim 1 where mesh size of the mesh screen is 150–200 mesh.

3. The precious metal recovery method of claim 1 wherein concentration of said hydrochloric acid solution is between 0.5% to 20%, depending on acid soluble inorganic mineral components of said solid to achieve a strongly acidic solution.

4. The precious metal recovery method of claim 3 wherein the concentration of said hydrochloric acid solution is between 5 to 10%.

5. The precious metal recovery method of claim 1 wherein said oxidizing agent, $Cl_2$, is created in said extraction vessel by the addition of hypochlorite salts.

6. The precious metal recovery method of claim 5 wherein the hypochlorite salt is preferably sodium hypochlorite.

7. The precious metal recovery method of claim 1 wherein said extraction time is 1–2 hours.

8. The precious metal recovery method of claim 1 wherein said concentrated base is sodium hydroxide or sodium carbonate.

9. The precious metal recovery method of claim 8 wherein the sodium hydroxide base solution is added as a 50% solution.

10. The precious metal recovery method of claim 1 wherein performing extraction of residual solids from residual leach solution with counter current extracting.

11. The precious metal recovery method of claim 1 wherein precipitated base metal hydroxides are filtered or centrifuged to remove said base metals hydroxides.

12. The precious metal recovery method of claim 1 wherein said residual solids can be used as pozzolanic materials in concrete.

13. The precious metal recovery method of claim 1 wherein said residual solids are mixed with said base metal precipitates and mixture can be used as pozzolanic materials.

14. The precious metal recovery method of claim 1 wherein said concentrated base is used to adjust solution pH to about 8.0 to 9.0.

15. The precious metal recovery method of claim 14 wherein said concentrated base is sodium hydroxide.

16. The precious metal recovery method of claim 1 wherein said resin to remove residual base metals is strong acid cation.

17. The precious metal recovery method of claim 16 wherein said base metals are reduced to below 10 ppm by treatment with said strong acid cation resin.

18. The precious metal recovery method of claim 1 wherein source material is selected from mine tailings, low-concentration precious metals ores, and recovered catalysts.

19. A precious metal recovery method comprising:
    dissolving mixture of recovered precious metals from claim 1 in hydrochloric acid and an oxidizing agent;
    forming chloride salts and separating salts by a chromatographic resin in a chromatographic apparatus; and
    reducing said chloride salts to pure metal by a reducing agent.

20. The precious metal recovery method of claim 19 wherein said precious metal salts are reduced by hydrogen to pure metal.

21. The precious metal recovery method of claim 19 wherein said precious metal salts are reduced by sodium borohydride to pure metal.

22. The precious metal recovery method of claim 19 wherein said chromatographic resin is a cross-linked spherical particle polystyrene resin.

23. A precious metal recovery method comprising:

dissolving a mixture of precious metals and base metals in hydrochloric acid and an oxidizing agent;

forming chloride salts and separating said chloride salts by a dual resin system in a chromatographic apparatus comprising two chromatographic columns;

removing the base metals by ion exchange on first column;

concentrating precious metal salts;

separating precious metal salts on second chromatography column; and recovering the separated precious metals by reduction of the separated precious metal salts to pure metals by a reducing agent.

24. The precious metal recovery method of claim 23 wherein said precious metal salts are reduced by hydrogen to pure metal.

25. The precious metal recovery method of claim 23 wherein said precious metal salts are reduced by sodium borohydride to pure metal.

26. The precious metal recovery method of claim 23 wherein said chromatographic resin is a cross-linked spherical particle polystyrene resin bead.

* * * * *